Figure 1:
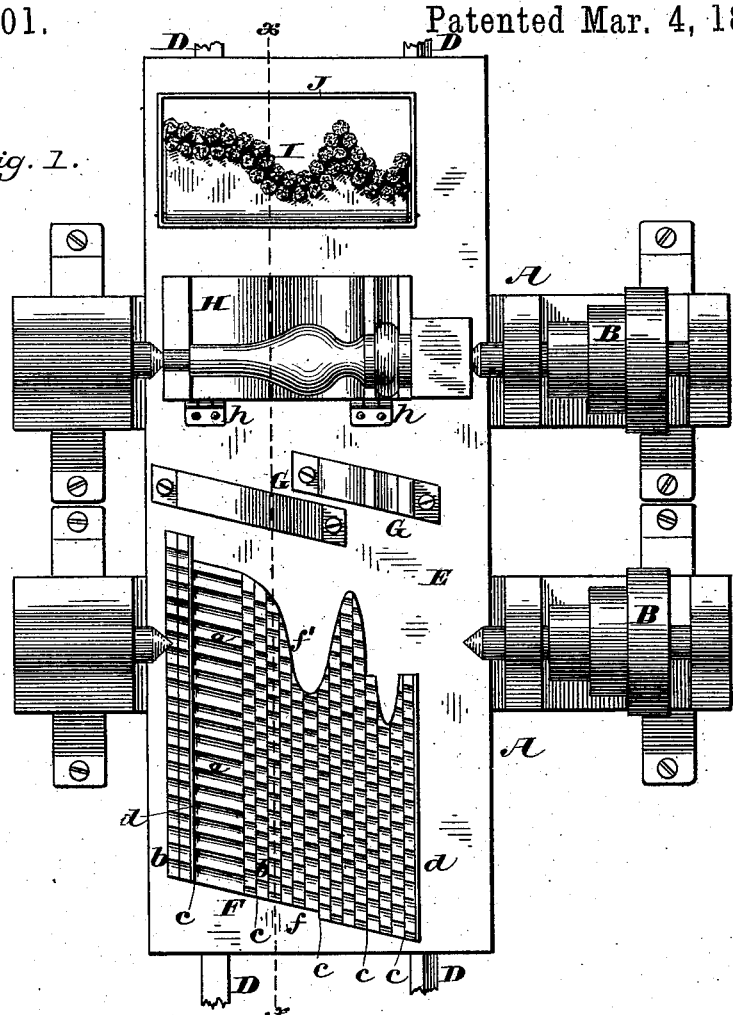

(No Model.)

H. W. FARLEY.
TURNING LATHE.

No. 294,601. Patented Mar. 4, 1884.

Attest:
Edmund F. Brodhag
Howell Battle

Inventor:
Henry W. Farley
by Johnson and Johnson
Attys

UNITED STATES PATENT OFFICE.

HENRY W. FARLEY, OF OSWEGO, ILLINOIS.

TURNING-LATHE.

SPECIFICATION forming part of Letters Patent No. 294,601, dated March 4, 1884.

Application filed October 16, 1883. (No model.)

*To all whom it may concern:*

Be it known that I, HENRY W. FARLEY, a citizen of the United States, residing at Oswego, in the county of Kendall and State of Illinois, have invented new and useful Improvements in Turning-Lathes, of which the following is a specification.

My invention relates to lathes for turning regular forms; and my said invention consists in combining with a suitable carriage adapted to have a reciprocating movement across the lathe-bed a cutting device carried thereby, formed of parallel joining rows or groups of long and short straight cutting-edges, in step form, gradually inclined vertically to the surface of the carriage from the receiving to the finishing end of said cutter, each row or group of cutting-edges being of unequal length from their entering to their finishing ends, and the joining rows terminating at said finishing ends, so as to form an ascertained irregular consecutive or continuous forming-line, the counterpart of the curved outline of the article produced by the said straight-edged cutters, whereby the article is reduced gradually and formed as each row or group of cutters ceases to act, the rows or groups having the shortest length and least projection from the surface of the carriage forming the curves or beads of greatest diameter, and first ceasing to cut, and the joining rows having the greatest length and the greatest projection from the surface of the carriage forming the curves or beads of least diameter, and being the last to cut, the form being thus produced by straight-edged cutters, as contradistinguished from a molding-cutter the edge whereof gives the form of the produced article. With such a cutter I also combine one or more knife or saw edge cutters or blades, arranged lengthwise with the rows or groups of cutters on the same vertical inclined plane, to produce the shoulders on the article, and these shoulder-forming cutters terminate at the ascertained irregular consecutive or continuous line formed by the different lengths of the rows of cutters. One or more separate and distinct cutters of the same shape as the contour of the produced article are arranged just behind the ascertained irregular consecutive or continuous finishing-line of the cutter, to give a smooth finish to the work; but these auxiliary smoothing-cutters may be dispensed with, as the work will be produced with a smooth finish without them. A sand-paper device and an oiling or burnishing device are preferably arranged upon the carriage to follow the cutters and complete the work. In working metal, stone, or other similar material, the sand-paper and oiling or burnishing devices may or may not be used.

Figure 2:
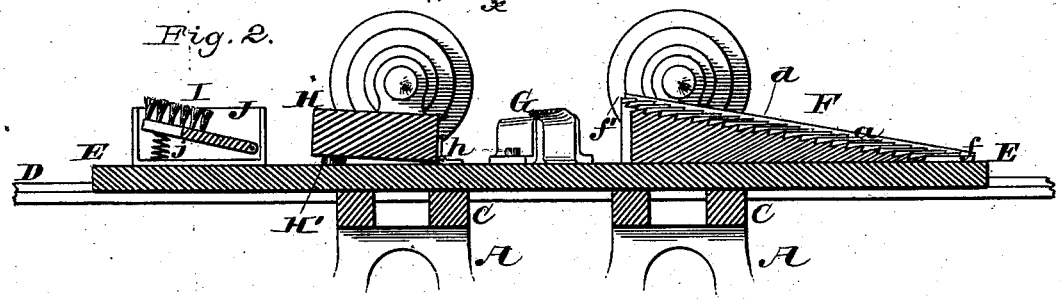
Figure 3:
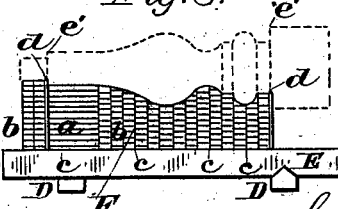

In the drawings, Figure 1 represents a plan view of the platform or table constructed according to my invention, with a series of gradually upwardly-inclined cutters in long and short lengths, smoothing-blades, sand-paper block, and polishing-brush, arranged to slide or reciprocate upon suitable ways or guide-rails across the bed of one or more lathes; Fig. 2, a central transverse section of the same on the line $x\,x$ of Fig. 1; Fig. 3, an end view in illustration of the gradually upwardly-inclined cutters, and the outline produced at their ends by the arrangement together of the several long and short sections of the cutters.

A A are two of a series of lathes having the usual head and tail stocks and pulleys B B, by which motion is imparted to the work transversely across the beds C C, upon which are secured rails or ways D D, which support and hold a platform or table, E. Any number of these lathes arranged to carry and impart motion to the work may be employed, and the said table E may be of any desired length and arranged to reciprocate backward and forward beneath the work by any suitable automatic machinery similar to the planing-machines; or the same may be operated by hand, and merely a single backward and forward movement given to the same, as may be desired or found to accomplish the desired result.

Upon the front end of the table or bed E is arranged a series of cutters, F, which are made to gradually increase in height from the plane of the table from the front edge, $f$, to the top finishing end, $f'$, and these cutters may either be in one structure whose end will so terminate as to impart the desired outline to the article, or they may be comprised of a series of separate cutters arranged side by side on the same gradual upwardly-inclined plane, and with their cutting-edges straight, and standing inclined to the axis-line of the lathe-centers, as shown in Fig. 1; or some of the cutting-edges may so stand, and others may stand parallel to said axis-line, this latter arrangement not being shown; or all the cutting-edges may stand parallel to the axis-line of the centers, as shown in Fig. 3, as it is obvious that the direction of such cutting-edges is immaterial, so long as they are grouped in rows of different lengths, so as to terminate with the irregular consecutive forming-line, as described, and have different lengths of straight cutting-edges—that is to say, the cutter comprising the series of gradually upwardly-inclined cutting-faces, *a*, may incline at an angle to the axis of the work and be made long, while those *b* adjacent to the ones *a* may be narrow and have straight cutting-surfaces parallel with the axis of the work. As before stated, the cutter may be of one structure; but it is preferred to form it of separate sections, (represented by the parallel lines *c*,) whereby said sections may be arranged in proper lengths adjacent to one another, so as to give to the finishing ends the proper contour to the article upon which they have acted. At certain proper intervals between these sections of cutters are arranged saw or knife edge blades *d*, which gradually increase in height from the front to the rear end, and which form the means for dividing the different portions of the work, or forming the straight shoulders occurring in the same, as shown at *e* and *e'*, Fig. 3. Just behind the series of cutters F is arranged, preferably at the same cross-angle therewith, one or more knives, G, the cutting-edge of which is at a slightly greater elevation than the ends *f'* of the cutters F, and having an outline similar to the desired outline of the finished article. H is a sand-paper block hinged to the sliding table at its front, as at *h*, and resting upon a cushion, H', at its back, and I is an oil burnishing or varnishing brush hinged in a tray, J, secured to the table E, and having a spring, *j*, to keep it against the work.

The operation is as follows: The stick of wood or other material having been placed and properly secured between the lathe-centers, a rapid revolution is imparted to the same in the usual manner. The table carrying the series of cutters, &c., being upon the ways D, back of the work, is then made to advance toward and beneath the revolving stick. The lower front end, *f*, of the cutters first comes against the wood when the cutting of the material or reduction of the same is commenced. Then in rapid succession the other teeth or next higher cutting-edges are presented against the material, and so on until the entire series of cutters have acted, when the article presents the desired outline of the finished work, as shown in Figs. 1 and 3. As these cutters are advanced beneath the work, the knife-edge cutters dividing the sections of the outline of the work come into play and transversely divide the grain of the material, preventing chipping of the same, and form the shoulders *e* and *e'*. If desired, this may complete the operation, the cutters being so arranged gradually one above the other and of such form that the rough wood or blank is first roughed or reduced, then gradually reduced step by step and formed into proper shape by cutters whose shape and cut gradually change, so that by the time the article passes over the last cutter it is completed and ready for use; but to arrange one or more separate smoothing cutter-blades just behind the series of cutters, as herein shown, is preferred, and also the employment of a separate sand-paper block and oil polishing or varnishing brush.

Instead of having the cutters terminate at irregular heights and intervals, as shown, they may be all of the same height and terminate on the same line, in which case cylindrical or work of regular outline would be the result. When thus employed, the cutters may have straight faces and be presented to the work in a straight line—that is, in lines parallel to the axis of the lathes.

I claim—

1. With the centers of a turning-lathe and a suitable carriage adapted to be reciprocated across the lathe-bed, the combination of a cutting device consisting of a series of cutters, *a b*, arranged upon said carriage, having straight cutting-edges of different lengths, and joining in parallel rows or groups *c*, their cutting-edges in step form gradually inclined vertically to the surface of the carriage from the receiving to the finishing end of said cutter, the rows or groups *c* being of unequal length from their entering ends *f* to their finishing ends, the latter terminating in an ascertained irregular consecutive or continuous forming-line, *f'*, the counterpart of the curved outline or contour of the article produced by said straight-edged cutters, substantially as described.

2. The combination, with the centers of a turning-lathe, of a suitable carriage adapted to have a reciprocating movement across the lathe-bed, and a cutting device consisting of a series of cutters, *a b*, arranged upon said carriage in parallel joining rows or groups *c* of unequal length, the cutting-edges whereof being straight and of unequal length, inclined in step form, the said rows or groups terminating in an ascertained irregular consecutive or continuous forming-line, *f'*, the counterpart of the curved outline or contour of the article produced, and one or more knife or saw edge cutters or blades, *d*, arranged at suitable points lengthwise between the said rows or groups of cutters *a b*, coincident with the inclined cutting-surface thereof, substantially as described, for the purpose specified.

3. The combination, with the centers of a turning-lathe, of a suitable carriage adapted to have a reciprocating movement across the lathe-bed, a cutting device consisting of a series of cutters, a b, arranged upon said carriage in parallel joining rows or groups c of unequal length, the cutting-edges being straight and of unequal length and inclined in step form, the said rows or groups terminating in an ascertained irregular or continuous forming-line, $f'$, the counterpart of the curved outline or contour of the article produced, and one or more separate cutters or blades, G, having a cutting-edge conforming to the finished article and to the said irregular consecutive terminal forming-line, substantially as described, for the purpose specified.

4. The combination, in a turning-lathe, of a suitable carriage, E, adapted to have a reciprocating movement across the lathe-bed, with a cutting device consisting of rows of reducing and forming cutters F, constructed and arranged substantially as described, a suitable sand-paper block, H, and an oil or burnishing brush, I, all arranged upon said carriage, for operation substantially as described.

5. A lathe for turning forms, comprising a platform adapted to be reciprocated beneath the work, reducing and forming cutters F, arranged thereon in series of different lengths, which gradually increase in height from the plane of the table in step form, the inclined knife or saw edged shoulder-forming cutters d, the smoothing blade or blades G, the sand-paper block H, and the finishing oil-brush, all constructed and adapted for operation substantially as described.

In testimony whereof I have hereunto set my hand in the presence of two subscribing witnesses.

HENRY W. FARLEY.

Witnesses:
  H. S. LADD,
  WALTER M. LADD.